United States Patent
Mitchell et al.

(10) Patent No.: US 6,320,883 B1
(45) Date of Patent: Nov. 20, 2001

(54) METHOD AND APPARATUS FOR AUTOMATIC SELECTION OF AN UNKNOWN ISDN REFERENCE

(75) Inventors: Eric P. Mitchell, Vancouver, WA (US); Connie D. York, Riverton; Patrick A. Tucker, Sandy, both of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 08/954,923

(22) Filed: Oct. 21, 1997

(51) Int. Cl.[7] .................................................. G05B 23/02
(52) U.S. Cl. ...................................... 370/522; 379/399.01
(58) Field of Search ..................................... 370/419–421, 370/463, 465, 466, 522, 524, 904, 242, 244, 248; 379/441–443, 399, 399.01; 340/825.06, 825.16, 825.17, 825

(56) References Cited

U.S. PATENT DOCUMENTS

| | | | |
|---|---|---|---|
| 4,879,739 | * 11/1989 | Forson | 379/21 |
| 4,910,729 | 3/1990 | Coffelt et al. | 370/17 |
| 5,142,429 | * 8/1992 | Jaki | 361/56 |
| 5,157,665 | * 10/1992 | Fakhraie-Fard et al. | 714/712 |
| 5,392,327 | * 2/1995 | Galpin | 379/2 |
| 5,444,703 | 8/1995 | Gagliardi et al. | 370/60.1 |
| 5,450,486 | * 9/1995 | Maas et al. | 379/399 |
| 5,577,115 | * 11/1996 | Deutsch et al. | 379/399 |
| 5,815,505 | * 9/1998 | Mills | 370/522 |

OTHER PUBLICATIONS

Galpin, "2 Wire Access to Basic ISDN–the Commercially Viable Solution"Customer Access, IEE Colloquium on, 1990, pp. 3/1–3/3.*

Hac et al. "Broadband ISDN Protocol and Interface Structures" Local Computer Networks, 1989., Proceedings 14th, pp.:189–195.*

Wright et al. "A Modular Design for Providing ISDN Switching Hardware in the GTD–5 EAX" Computers and Communications, 1988. Conference Proceedings.,pp.: 370–373.*

* cited by examiner

Primary Examiner—Chau Nguyen
Assistant Examiner—Jasper Kwoh
(74) Attorney, Agent, or Firm—Workman, Nydegger & Seeley

(57) ABSTRACT

A method and apparatus for discerning between unknown but standardized ISDN interfaces, such as the U and S/T reference points, and automatically selecting compatible routing for the respective interface to compatible ISDN equipment. An unknown reference point supported by an ISDN service provider is interfaced with a reference adaptor comprised of an interface selection circuit which discerns the standardized form of the unknown reference point presented by the service provider and appropriately switches a relay means for routing the unknown interface reference point to ISDN equipment, either directly or indirectly through a transformation NT-1 device. Protection circuitry prevents signals from one reference interface from damaging sensitive circuitry of another reference interface.

7 Claims, 3 Drawing Sheets

METHOD AND APPARATUS FOR AUTOMATIC SELECTION OF AN UNKNOWN ISDN REFERENCE

BACKGROUND OF THE INVENTION

1. The Field of the Invention

This invention relates to standardizing interfaces of computer equipment in a network structure. More particularly, this invention relates to implementing a standardized interface compatible with a plurality of interfaces common to Integrated Services Digital Networks (ISDN).

2. Present State of the Art

Increasingly, users of personal computers and related computer equipment employ and utilize public and private telephone lines to transmit and receive data. Such a capability of interconnecting a computer with a plurality of locations dramatically increases the value of a computer and the productivity of the computer user. As the number of accessible public and private networks increases so also does the public's use of such systems. As is well-known, computer equipment such as personal computers, communicate across telephone lines, such as the Public Switched Telephone Network (PSTN) and interact with remote sites using the existing infrastructure of the PSTN. Traditional interfacing of a personal computer with the PSTN has occurred through the use of modem technology. The term "modem" is an acronym derived from the phrase "modulator-demodulator," which is descriptive of the basic function performed by the modem. A modem permits the personal computer, which is a digital device, to be interfaced with telephone lines by modulating the outgoing digital data into a form compatible with the telephone network, which is designed to handle analog signals. Similarly, the modem reverses that process by demodulating incoming analog data from the telephone lines so that it is in a digital form that is usable by the computer.

The manner in which telephone equipment is interfaced to a public or private telephone network, both physically and electrically, has been largely standardized. That is to say, a personal computer user having a modem may confidently compatibly interconnect with the PSTN using a standard telephone cable. One of the standardized interfacing components of the PSTN system is the physical media connector through which telephone equipment may be physically and electrically connected to the telephone subscriber line. The standard media connector used in the United States is the RJ-11, six pin miniature module and plug. As is well-known, most telephone equipment is equipped with the RJ-11 module, into which is received the RJ-11 plug and associated twisted-pair telephone cable, which is then plugged into, for instance, a telephone wall jack, also a standard RJ-11 module. In this manner, the telephone, modem, or other related telephone equipment is physically and electrically interfaced with the telephone subscriber loop. Voice or transmission data is then transmitted in analog form through the RJ-11 physical/electrical media connector into the telephone line.

As additional users utilize the network created by the PSTN, and as individual users demand enhanced bandwidth for multimedia information, standard PSTN data transmission rates are strained and often inadequate. To facilitate the transmission of larger amounts of data across a network, additional network standards have evolved. For example, Integrated Services Digital Network (ISDN) provides an improved partitioning of the physical network resources into channels. A typical standard ISDN service provides two B-channels operating at a combined frequency of 128 Kbps and one D-channel for exchanging digital data at much higher rates than standard PSTN analog systems. Such an ISDN standard has become universally accepted throughout the world as a higher data rate system while ISDN compatible equipment has also become commonplace.

Although the ISDN system standards have become internationally accepted, implementations and configurations associated with interfacing two ISDN systems have not become standardized. For example, the ISDN system is comprised of a series of "reference points" which define physical interfacing locations. Referring to FIG. 1, reference points that are in common use for ISDN systems include the R, S, T and U reference points. It is not uncommon to refer to the S and T reference points in combination as S/T or just as the S with an implied T reference point.

Referring to FIG. 1, a U reference point 24 provides the access interface point for ISDN 26. U reference point 24 provides the physical interface point through which the wiring routes directly to the local network service provider. Such an interface corresponds to a connection jack located within a commercial or residential installation. In the United States, U reference point 24 represents the termination of the services provided by the network provider such as a telephone company. Other additional interfaces and equipment are implemented within user equipment attached thereto. In ISDN implementations outside of the United States, an S reference point 16 or a T reference point 20, also commonly known as the S/T reference point, is included in the physical service or equipment provided by the network service provider to a user. Such a difference between national and international standards becomes extremely important for utilization of non-domestic equipment and utilization of existing ISDN configurations by world travelers. That is to say, users of a personal computer 10 and associated equipment such as a terminal adaptor 14 in the United States must employ a special device to handle the physical interface translation through an NT-1 equipment 22. While some equipment incorporates the U reference point to S/T reference point translation, other equipment requires a separate NT-1 22 equipment for signal translation. For completeness, an R reference point 12 denotes the point between an ISDN terminal adaptor 14 and non-ISDN equipment such as personal computer 10.

Due to the global discrepancies in the reference point provided to a user for interfacing their communication equipment, substantial confusion and damage may result from inadvertent interconnection with an incompatible interface. Such differences in interface standards provided by service providers require an unnecessary level of sophistication on the part of the user to identify which reference point is being provided by the service provider. Further confusion is induced due to the commonality of accepted physical interface standards. For example, both the U reference point and the S/T reference points employ a standard RJ-45 connector as the standardized interfacing telephone receptacle. However, as introduced above, the electrical standards for the U reference point and the S/T reference point differ considerably. For example, the U reference point provides a DC voltage of 52 volts between pins 4 and 5 on the RJ-45 connector. Although the RJ-45 connector is a six pin connector, the U interface is standardized as a 2-wire interface utilizing only pins 4 and 5. The S/T reference, on the other hand, also utilizes the RJ-45 connector, however, the S/T reference point employs a 1.25 volt peak-to-peak clock running at 97 kHz on the receive differential pair. The 97 kHz clock of the S/T reference point is also carried on pins 4 and 5 of the RJ-45 connector.

Prior configurations of equipments for interfacing with an ISDN system have provided both the U reference point interface in one connector while providing a separate distinct connector compatible with the S/T reference point. Such a dual configuration required a user to select the compatible reference point for equipment connection with the service provided by the service provider.

Thus, it appears that there exists no present technique for providing a common interface from which a user of communication equipment may interface directly with an ISDN system regardless of the reference point provided by the ISDN service provider. Furthermore, there does not currently exist a technique for automatically sensing and adapting a common interface on ISDN equipment with an unknown reference point supported and provided by an ISDN service provider. Therefore, a need exists for providing a method and system for automatically configuring an ISDN equipment interface for compatible operation with either a U reference point as provided by a portion of ISDN service providers or an S/T reference point as provided by yet another portion of ISDN service providers, without requiring a user of the ISDN equipment to determine the nature of the reference point provided by the ISDN service provider.

SUMMARY AND OBJECTS OF THE INVENTION

It is an object of the present invention to provide a method for interfacing ISDN equipment with an ISDN service provider wherein the ISDN reference point supported by the service provider is of unknown configuration but takes the form of either a U reference point or an S/T reference point as defined by industry standards.

It is another object of the present invention to provide a method for ISDN equipment when connected with an ISDN system to discern between a U reference point and an S/T reference point and compatibly configure thereto.

It is yet another object of the present invention to provide an apparatus for incorporation within ISDN equipment that appropriately switches and routes signaling information received from an ISDN provider to the appropriate reference point within the ISDN equipment.

It is a further object of the present invention to provide a circuit for detecting an unknown reference point provided by an ISDN service provided and compatibly relaying the reference point signals to ISDN equipment connected therewith.

The present invention embodies within its scope both methods and systems for discerning and discriminating between unknown standardized ISDN interfaces, wherein ISDN equipment incorporating or interfacing with the present invention selects and compatibly conforms with the respective interface thereby providing a compatible interface through which ISDN equipment may interact with an ISDN service provider.

The present invention comprises a reference adaptor through which an unknown reference point supported by a service provider may be automatically detected and compatibly routed for facilitating interaction of ISDN equipment with a service provider's ISDN system. The reference adaptor interfaces to an unknown reference point of the ISDN service provider through a connector which, in the preferred embodiment, adheres to the standardized ISDN interface physical connection standard by employing an RJ-45 6-pin connector, wherein pins 4 and 5 of the connector are commonly employed by both the U reference point and the S/T reference point. However, the characteristics of the signals carried on such lines vary thereby allowing a detection circuit to examine such characteristics and create an evaluation signal for appropriately setting a relay circuit to compatibly route the unknown reference point to ISDN equipment.

The reference adaptor is comprised of an interface selection circuit for evaluating the unknown reference point to determine the reference point supported by the service provider, thereby compatibly relaying or connecting the unknown reference point with ISDN equipment or signal conditioning circuitry so as to convert the unknown reference into a signal compatible for interfacing with ISDN equipment. The interface selection circuit is comprised of a detection circuit and a relay circuit. The detection circuit is comprised of a zener diode in series with a resistor, which together generate an evaluation signal, which in the preferred embodiment, takes the form of a voltage level. When the unknown reference point interfaced at the connector takes the form of an S/T reference point, pin 4 presents a 1.25 volt peak-to-peak clock to the detection circuit and the diode does not breakdown and conduct from such a low voltage. Therefore, the relay circuit remains in the normal position. When the unknown reference point interfaced with the connector takes the form of a U reference point, pin 4 of the connector maintains a voltage of approximately 52 volts thereby causing the zener diode of the detection circuit to breakdown and conduct current. Such conduction of current results in causing the switching of the relay circuit.

A relay circuit is coupled and responsive to the detection circuit for compatibly routing the received unknown reference signals to the appropriate reference points. The relay circuit is comprised of relays which generally switch pins 4 and 5 of the connector between the S/T reference point interface and the U reference point interface as directed by the evaluation signal resulting from the detection circuitry. The relays may generally take the form of normally closed and normally open switches which are activated and isolated by photodiodes.

The reference adapter further comprises protection circuitry for preventing signals from one reference interface from damaging sensitive circuitry of another reference interface and, when the unknown reference point provided by the service provider takes the form of an U reference point, the signals are further routed and conditioned by an NT-1 termination is then routed and conditioned to form an S/T reference point which provides a standardized interface for traditional ISDN equipment including performing line transmission termination, timing requirement, and transformation from a two-wire interface to a four-wire interface.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention embodies within its scope both methods and systems for interfacing ISDN equipment into an ISDN system wherein the reference point supported by an ISDN service provider is unknown to an ISDN equipment user but takes on one of the standards of either a U reference point or an S/T reference point, in accordance with established ISDN standards.

The present invention further embodies not only detection circuitry for determining which type of reference point is provided by a service provider, but further provides switching circuitry for compatibly routing such interface signals to intermediary signal-conditioning modules, such as an NT-1 when the unknown reference point is a U reference point.

Figure 1:
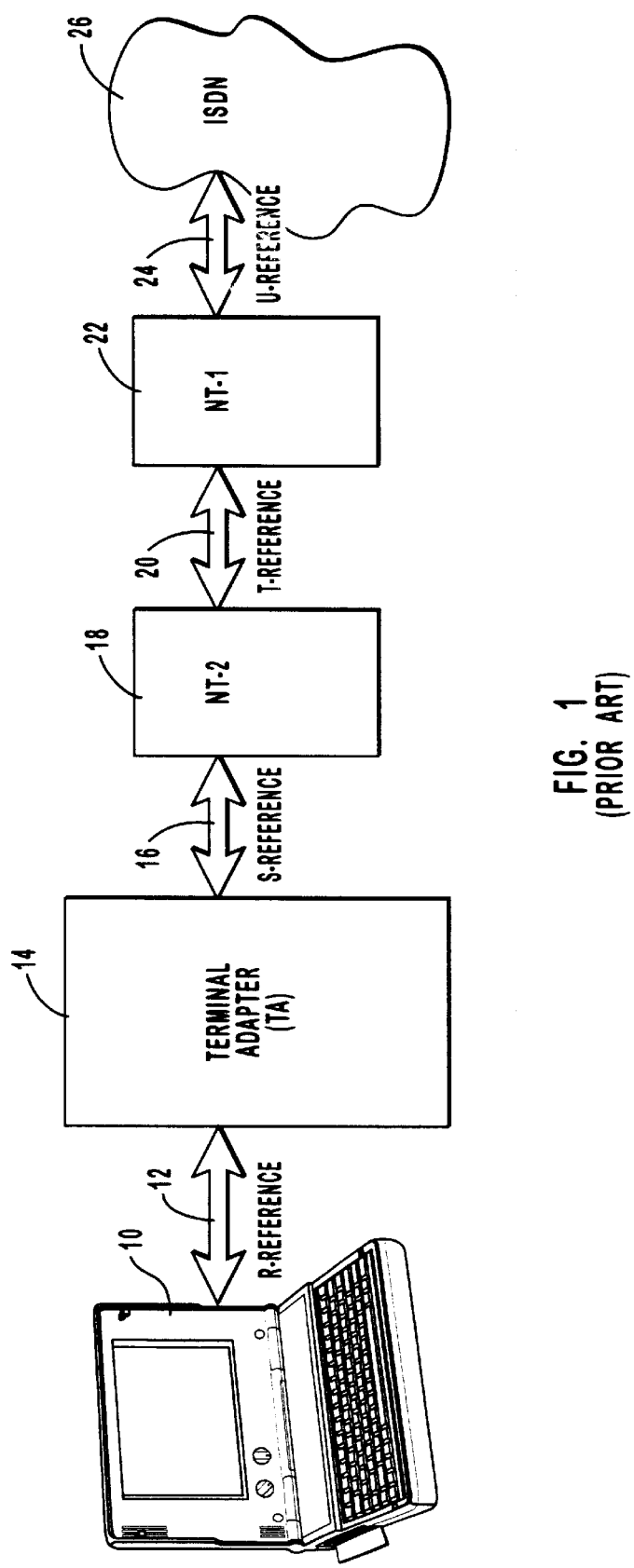
FIG. 1 is a simplified block diagram of ISDN equipment interfacing with an ISDN system, in accordance with established interfacing standards for an ISDN system.

As described in FIG. 1, ISDN standards have defined a series of reference points designating interface specification standards to which equipment interfacing with an ISDN system should adhere. As discussed above, ISDN systems may vary depending upon the amount of functionality incorporated by the service provider. A service provider may therefore present differing reference points to which user equipment must be interfaced.

Figure 2:
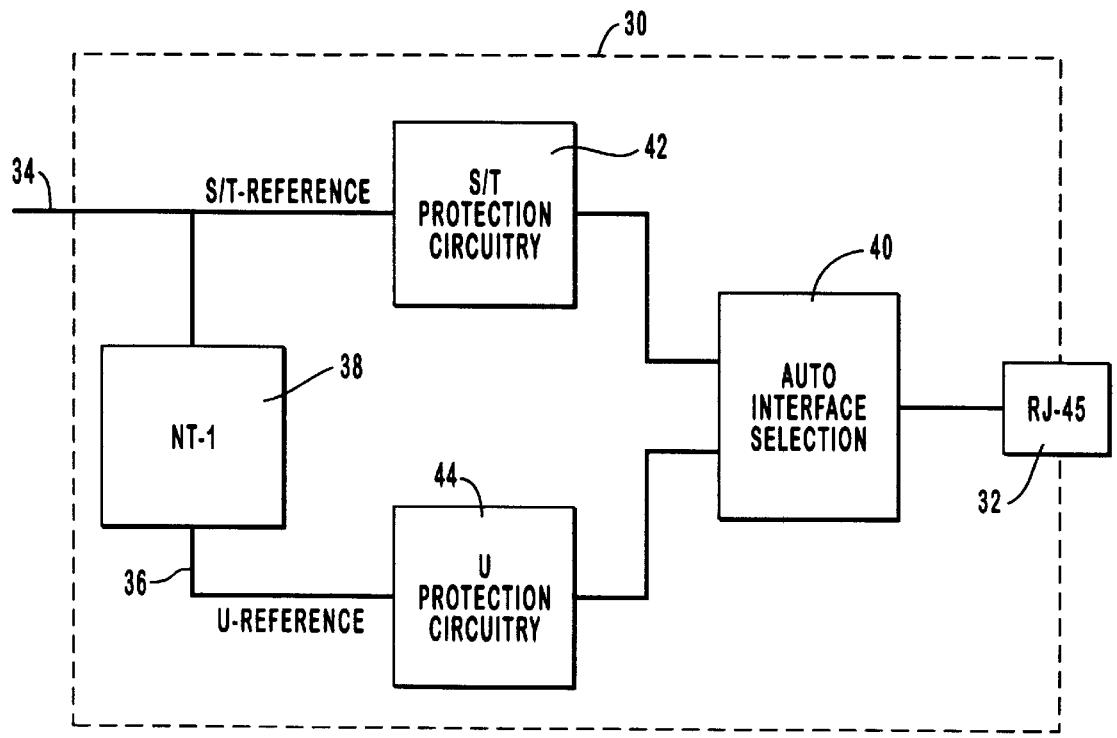
FIG. 2 is a simplified block diagram of a reference adaptor for compatibly interfacing with an unknown reference point, in accordance with a preferred embodiment of the present invention.

FIG. 2 is a simplified block diagram of a reference adaptor 30 through which an unknown reference point supported by a service provider may be automatically detected and compatibly routed for facilitating interaction of ISDN equipment with a service provider's ISDN system. Reference adaptor 30 interfaces to an unknown reference point of the ISDN service provider through a connector 32. Connector 32, in the preferred embodiment, adheres to the standardized ISDN interface physical connection standard by employing an RJ-45 6-pin connector. The unknown reference point provided by the service provider is then routed and conditioned, if necessary, through reference adaptor 30 to form an S/T reference point 34. S/T reference point 34 provides a standardized interface to which standardized ISDN equipment, such as a terminal adaptor, may be interfaced with traditional equipment such as personal computers and telephones.

Reference adaptor 30 is further comprised of an interface selection circuit 40 for evaluating the unknown reference point to determine which reference point is supported by the service provider and compatibly relaying or connecting the unknown reference point with ISDN equipment or signal conditioning circuitry so as to convert the unknown reference into a signal compatible for interfacing with ISDN equipment.

Reference adaptor 30 additionally comprises S/T protection circuitry 42 and U protection circuitry 44 for preventing signals from one reference interface from damaging sensitive circuitry of another reference interface. For example, the U reference point as defined in an ISDN system presents a DC voltage of 52 volts between pins 4 and 5 on an RJ-45 connector, such as connector 32. The U reference point as defined by ISDN standards employs a 2-wire interface. In contrast, the S/T reference point also defined by ISDN standards employs a differential pair or 4-wire interface which also uses pins 4 and 5 of an RJ-45 connector. However, the S/T reference point employs a much lower voltage standard different from a 52 volt DC level. The S/T reference point operates on a 97 kHz clock running at 1.25 volts peak-to-peak. S/T protection circuitry 42 and U protection circuitry 44 further provide the regulatory line isolation as dictated by safety standards.

When the unknown reference point supplied by the service provider takes the form of a U reference point, transformation to an S/T reference point is required for interfacing with most ISDN equipment. A network termination (NT-1) 38 provides a transformation from a U reference point 36 to S/T reference point 34 including performing line transmission termination, timing requirement, and transformation from a two-wire interface to a four-wire interface.

Figure 3:
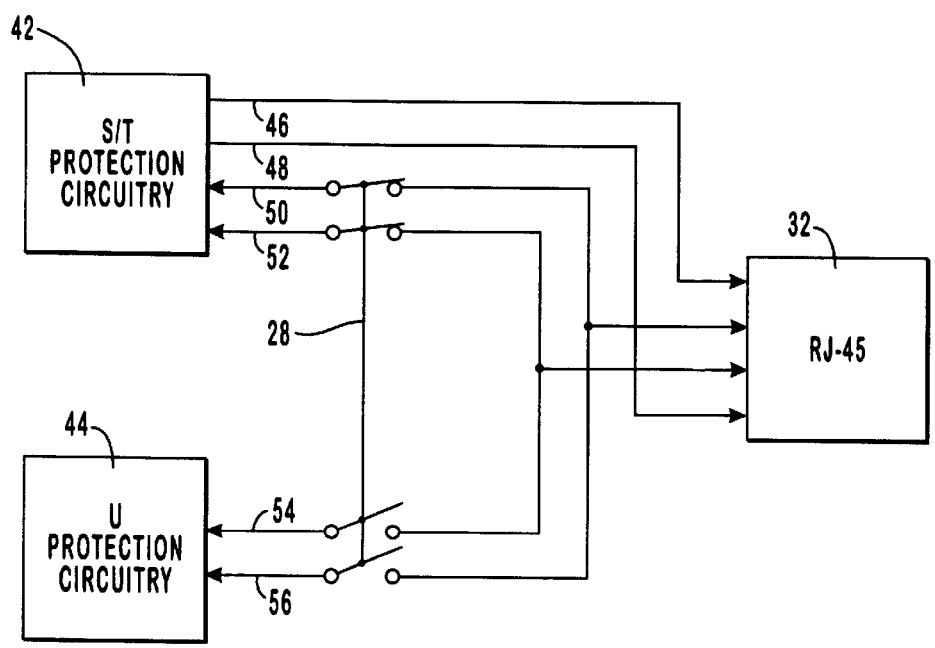
FIG. 3 is a simplified block diagram of an interface selection circuit for identifying and appropriately switching an unknown reference point, in accordance with a preferred embodiment of the present invention.

FIG. 3 is a simplified block diagram of the relaying of an unknown reference, in accordance with a preferred embodiment of the present invention. A service provider presents an unknown reference-type coupled through a connector 32 to a interface selection circuit 40 (FIG. 2) for evaluation of the unknown reference point and for subsequent relaying to the appropriate interface. In FIG. 3, detection circuitry of the interface selection circuitry generates an evaluation signal 28 as the result of the evaluation of the unknown reference point. Generation of evaluation signal 28 by the detection circuitry is detailed in FIG. 4.

In an ISDN system, the S/T reference point is comprised of a 4-wire interface consisting of a transmit differential pair 46 and 48 and a receive differential pair 50 and 52. When the detection circuitry determines that the unknown reference point is an S/T reference point, evaluation signal 28 enables the relays associated with the receive differential pair 50 and 52 for interconnection of the unknown reference point with a compatible S/T reference point. As discussed above, S/T protection circuitry 42 provides the protection and buffering necessary to isolate and protect other S/T interface circuitry from the signal levels associated with the unknown reference point presented by the service provider.

Conversely, when the detection circuitry determines the unknown reference point to be a U reference point, then evaluation signal 28 switches relays associated with the tip and ring signals 54 and 56 which are characteristic of a U reference point interface. Likewise, U protection circuitry 44 isolates and prevents damage to the associated circuitry of the U interface which could be subject to damage from an unknown reference point signal condition.

In the preferred embodiment, the relays activated by evaluation signal 28 take the form of normally closed and normally open relays as depicted in FIG. 3. Relays associated with the S/T reference point are normally closed and when the unknown reference point connected to connector 32 presents an S/T reference point, evaluation signal 28 does not change the setting of the relays associated with the S/T reference interface point as they are in a normally closed position. In contrast, the relays associated with the U reference interface are switched from their normally open position to a closed position when toggled by evaluation signal 28.

Figure 4:
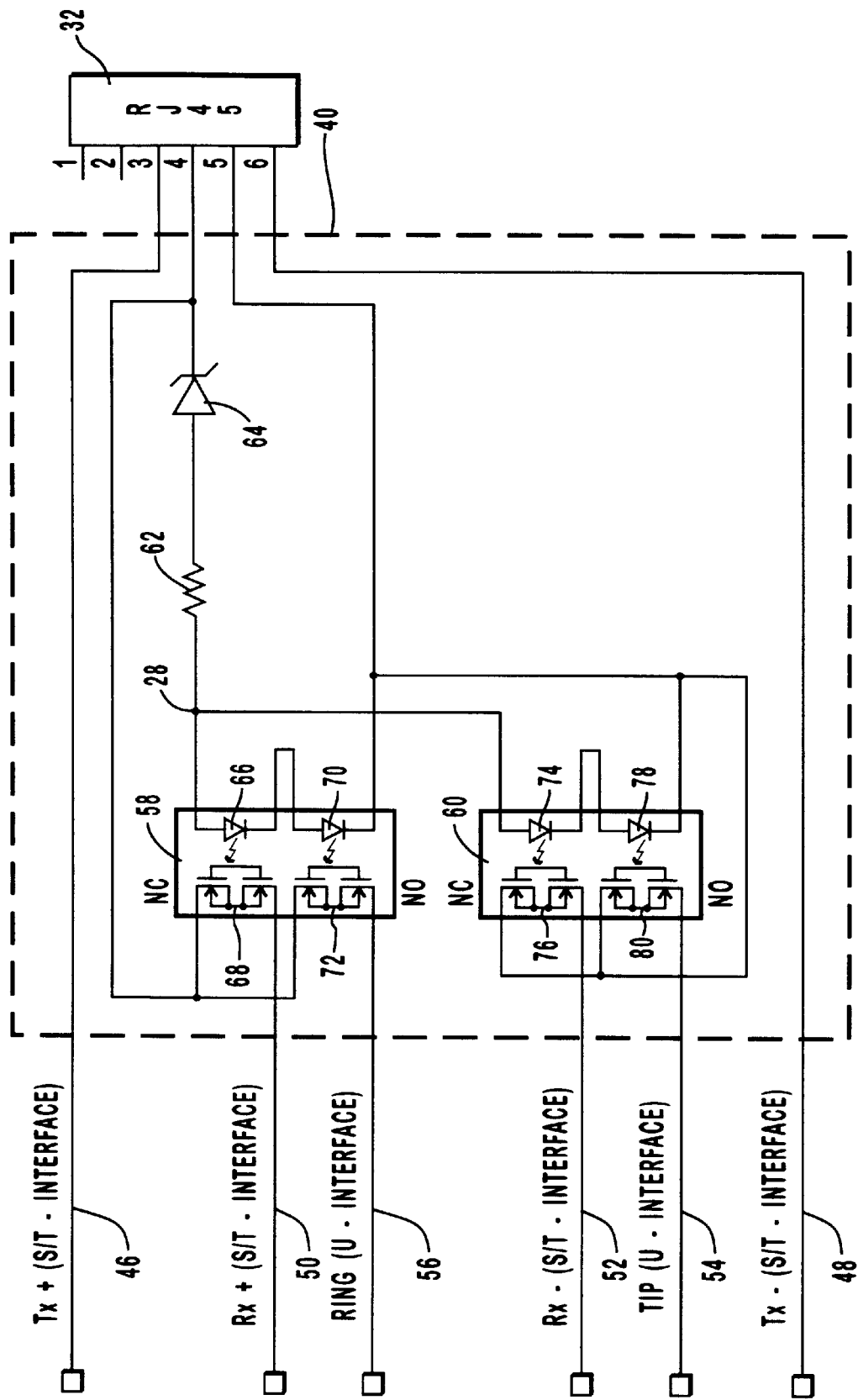
FIG. 4 is a schematic diagram of an interface selection circuit for distinguishing an unknown reference point, in accordance with the preferred embodiment of the present invention.

FIG. 4 is a schematic diagram of an interface selection circuit, in accordance with a preferred embodiment of the present invention. An unknown reference point supported by an ISDN service provider interfaces to interface selection circuit 40 through a connector 32, which in the preferred embodiment takes the form of an RJ-45 6-pin connector. As discussed above, pins 4 and 5 of connector 32 are commonly employed by both the U reference point and the S/T reference point, however, the characteristics of the signals carried on such lines vary thereby allowing a detection circuit to examine such characteristics and create an evaluation signal 28 (FIG. 3) for appropriately setting a relay circuit to compatibly route the unknown reference point to ISDN equipment.

In the preferred embodiment, the detection circuit is comprised of a zener diode 64 in series with a resistor 62. The resulting signal provides evaluation signal 28 (FIG. 3), which in the preferred embodiment, takes the form of a voltage level. Also, in the preferred embodiment, diode 64 is a 4.7 volt zener diode and resistor 62 is a 1K ohm resistor. When the unknown reference point is interfaced at connector 32 and takes the form of an S/T reference point wherein pin 4 presents a 1.25 volt peak-to-peak clock to the detection circuit comprised of diode 64 and resistor 62, diode 64 does not breakdown and conduct from such a low voltage. Therefore, the relay circuits remain in their normal positions.

A relay circuit is coupled and responsive to the detection circuit for compatibly routing the received unknown reference signals to the appropriate reference points. In the preferred embodiment, the relay circuit is comprised of switches or relays 58 and 60 which generally switch pins 4 and 5 of connector 32 between an S/T reference point interface and a U reference point interface as directed by evaluation signal 28 resulting from the detection circuitry. In the preferred embodiment, relay 58 is comprised of a normally closed switch 68 and a normally open switch 72.

Relay 58 further comprises a photodiode 66 for activating switch 68 and a photodiode 70, correspondingly activating switch 72. Likewise, a relay 60 is comprised of a switch 76 controlled by a photodiode 74, and a switch 80 controlled by photodiode 78 for alternatively relaying the signal conducted from connector 32 pin 5 of an unknown reference point. Exemplary relays 58 include a photoMOS relay or coupler such as an AQV214S manufactured by NAiS and a PS2705 manufactured by NEC Electronics.

Pins 3 and 6 of connector 32 form a portion of the four-wire S/T reference point (transmit differential pair 46 and 48) and pass directly to the ISDN equipment without any switching within interface selection circuit 40 since a conflicting pin-out arrangement between the U and S/T reference points does not arise. When interfaced to an unknown reference point, connector 32 conducts the signal conditions present at the unknown reference point to interface selection circuit 44 for diagnosis. When the unknown reference point takes the form of an S/T reference point, the 1.25 volt clock signal is insufficient to cause zener diode 64 to breakdown into conduction. Therefore, relays 58 and 60 remain in their normal positions wherein pin 4 of connector 32 is passed through the normally closed switch 68 to form the Receive +signal 50 of the receive differential pair of the S/T reference point. Likewise, pin 5 of connector 32 is routed through the normally closed switch 76 of relay 60 to form a Receive −signal 52 of the S/T reference point. As mentioned above, the Transmit +signal 46 and the Transmit −signal 48 of the S/T reference point pass through directly to the S/T reference point without any selection modifications.

When the unknown reference point interfaced with connector 32 takes the form of a U reference point, pin 4 of connector 32 maintains a voltage of approximately 52 volts thereby causing zener diode 64 of the detection circuit to breakdown and conduct current with a breakdown voltage of approximately 4.7 volts in the preferred embodiment. Such conduction of current results in diodes 66 and 70 of relay 58, and diode 74 and 78 of relay 60 to conduct and optically couple thereby causing the switching of switches 68, 72, 76 and 80, respectively. The 52 volt signal of pin 4 on connector 32 is then routed through switch 72 of relay 58 to form a ring signal 56 on the U reference point. Likewise, when a U reference point interfaces with a connector 32, pin 5 is passed through switch 80 of relay 60 to form a tip signal 54 thereby completing the two-wire interface of a U reference point. It should be noted that although the preferred embodiment incorporates optical coupled relays, other relay mechanisms including mechanical relays such as reed relays may also be incorporated.

The present invention may be embodied in other specific forms without departing from its spirit or essential characteristics. The described embodiments are to be considered in all respect only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An automatic interface selection circuit for interfacing Integrated Services Digital Network (ISDN) equipment having a known reference point type with an ISDN service provider having an unknown reference point type, said interface selection circuit comprising:

a) an analog detection circuit for electrically connecting to the ISDN service provider via an interface of the unknown reference point type so as to receive at least one sustained electrical signal from the ISDN service provider and thereby identify the unknown reference point type of the service provider based upon at least one characteristic of the electrical signal, said analog detection circuit comprising a voltage detection circuit coupled to at least one pin of the interface of said unknown reference point provided by the ISDN service provider so as to detect a voltage level of an electrical signal present on the at least one pin and thereby identify the reference point type of the connect ISDN service provider, said voltage detection circuit comprising:

i) a zener diode connected to said at least one pin of said unknown reference point such that said zener diode conducts when the voltage level present at the pin exceeds a predetermined amount; and ii) a current limiting resistor connected in relation with said zener diode to minimize degradation to a predetermined level of the signal on said unknown reference point when said zoner diode conducts; and b) a relay circuit coupled and directly responsive to said analog detection circuit to automatically switch and provide a compatible electrical connection between the known reference point type of the TSDN equipment and the unknown reference point type of the ISDN service provider.

2. The automatic interface selection circuit as recited in claim 1, wherein said unknown reference point is comprised of one of a U reference point and an S/T reference point.

3. A reference adaptor for interfacing an Integrated Services Digital Network (ISDN) equipment having a known reference point type to an ISDN service provider having an unknown reference point type selected from either a U reference point type or an S/T reference point type, said reference adaptor comprising:

a) an analog automatic interface selection circuit electrically connected between the ISDN equipment and the TSDN service provider so as to automatically determine the unknown reference point type of the ISDN service provider, the analog automatic interface selection circuit including:

a. an analog detection circuit for identifying whether the at least one sustained electrical signal corresponds to a U reference point type or an S/T reference point type, said detection circuit comprising a voltage detection circuit coupled to a first pin of said unknown reference point common to both said U reference point and said S/T reference point, said voltage detection means to distinguish between higher voltages associated with said U reference point and lower voltages associated with said S/T reference point, said voltage detection circuit comprising:

i) a zener diode connected to said first pin of said unknown reference point common to both said U reference and said S/T reference point such that said zener diode conducts when subjected to said higher voltage of said U reference point; and ii) a current limiting resistor in series with said zener diode to minimize degradation of signal on said U reference point when said zener diode conducts; and b. a relay circuit coupled and directly responsive to said analog detection circuit to automatically switch and provide a compatible electrical connection between unknown reference point type of the ISDN service provider and the known reference point type of the ISDN equipment; and b) a Network Termination (NT-1) circuit that electrically converts the signals present on the U reference point to be compatible with an S/T reference point when said automatic interface selection circuit determines said unknown reference point to be a U reference point type.

4. The reference adapter as recited in claim 3, further comprising at least one protection circuit coupled between the ISDN equipment and the ISDN service provider that electrically protects the ISDN equipment from incompatible signals presented by the reference point of the ISDN service provider.

5. The reference adaptor as recited in claim 3, wherein said relay circuit comprises:

a) a first switching means for coupling said first pin of said unknown reference point common to both said U reference point and said S/T reference point to said U reference point when said voltage detection means detects said higher voltage associated with said U reference point and said first switching means also for coupling said first pin of said unknown reference point to said S/T reference point when said voltage detection means detects said lower voltage associated with said S/T reference point; and b) a second switching means for coupling a second pin of said unknown reference point common to both said U reference point and said S/T reference point to said U reference point when said voltage detection means detects said higher voltage associated with said U reference point and said second switching means also for coupling said second pin of said unknown reference point to said S/T reference point when said voltage detection means detects said lower voltage associated with said S/T reference point.

6. The reference adaptor as recited in claim 5, wherein said first and second switching means comprise a relay having a normally opened switch and a normally closed switch coupled in parallel and switched by said voltage detection means.

7. The reference adaptor as recited in claim 6 wherein said relay is an optically coupled relay.

\* \* \* \* \*